(12) United States Patent
Miyazaki et al.

(10) Patent No.: US 9,019,447 B2
(45) Date of Patent: Apr. 28, 2015

(54) LIQUID CRYSTAL DISPLAY DEVICE WITH POLARIZING PLATES

(71) Applicants: Kayoko Miyazaki, Isesaki (JP); Keiji Tago, Kumagaya (JP); Hirokazu Morimoto, Fukaya (JP)

(72) Inventors: Kayoko Miyazaki, Isesaki (JP); Keiji Tago, Kumagaya (JP); Hirokazu Morimoto, Fukaya (JP)

(73) Assignee: Japan Display Inc., Tokyo (JP)

( * ) Notice: Subject to any disclaimer, the term of this patent is extended or adjusted under 35 U.S.C. 154(b) by 117 days.

(21) Appl. No.: 13/684,348

(22) Filed: Nov. 23, 2012

(65) Prior Publication Data
US 2013/0135564 A1 May 30, 2013

(30) Foreign Application Priority Data

Nov. 24, 2011 (JP) ................................. 2011-255737

(51) Int. Cl.
G02F 1/1335 (2006.01)
G02F 1/1337 (2006.01)
G02F 1/13363 (2006.01)

(52) U.S. Cl.
CPC ...... *G02F 1/133528* (2013.01); *G02F 1/13363* (2013.01); *G02F 2001/133531* (2013.01); *G02F 2201/54* (2013.01); *G02F 2202/28* (2013.01);
(Continued)

(58) Field of Classification Search
CPC .......... G02F 1/133528; G02F 1/18132; G02F 2202/08; G02F 2202/22; G02F 1/133536; G02F 1/133707; G02F 1/1393; G02F 1/133753; G02F 2001/133742; G02B 5/3033
USPC ............................................ 349/96, 130, 129
See application file for complete search history.

(56) References Cited

U.S. PATENT DOCUMENTS 7,541,074 B2 * 6/2009 Nakayama et al. ............ 428/1.3
7,927,672 B2 * 4/2011 Ohtani et al. .................. 428/1.3
8,331,025 B2 * 12/2012 Kobayashi et al. ...... 359/489.07
(Continued)

FOREIGN PATENT DOCUMENTS

JP 8-160223 6/1996
JP 2005-115056 4/2005
(Continued)

OTHER PUBLICATIONS

Japanese Office Action issued Oct. 28, 2013, in Japan Patent Application No. 2011-255737 (with English translation).
(Continued)

*Primary Examiner* — Mike Qi
(74) *Attorney, Agent, or Firm* — Oblon, McClelland, Maier & Neustadt, L.L.P.

(57) ABSTRACT

A liquid crystal display device comprising: a liquid crystal cell including a quadrilateral display surface and a liquid crystal layer enclosed between glass substrates and controlling light entering from a second surface side and exiting to a first surface side; a first polarizing plate including a polarizer having an absorption axis and adhered to the first surface side with an adhesive layer; and a second polarizing plate including a polarizer having an absorption axis and adhered to the second surface side with an adhesive layer such that one of the polarizing plates including the polarizer with a larger maximum dimension in an absorption axis direction on the display surface is adhered to the glass substrate with an adhesive layer having higher adhesion strength to the glass substrate than the adhesive layer of other polarizing plates including the polarizer with a smaller maximum dimension in the absorption axis direction.

4 Claims, 2 Drawing Sheets

(52) U.S. Cl.
CPC ......... *G02F 2413/02* (2013.01); *G02F 2413/08* (2013.01)

(56) References Cited

U.S. PATENT DOCUMENTS

| | | | |
|---|---|---|---|
| 2007/0236630 A1* | 10/2007 | Tago et al. | 349/96 |
| 2009/0066886 A1* | 3/2009 | Shimizu et al. | 349/96 |
| 2011/0181812 A1* | 7/2011 | Aminaka | 349/96 |

FOREIGN PATENT DOCUMENTS

| | | | | |
|---|---|---|---|---|
| JP | 2006-154731 | | 6/2006 | |
| JP | 2006154731 A | * | 6/2006 | ............ G02F 1/1335 |
| JP | 2007-279323 | | 10/2007 | |
| JP | 2011-90251 | | 5/2011 | |

OTHER PUBLICATIONS

U.S. Appl. No. 13/614,401, filed Sep. 13, 2012, Miyazaki, et al.

* cited by examiner

LIQUID CRYSTAL DISPLAY DEVICE WITH POLARIZING PLATES

CROSS REFERENCES TO RELATED APPLICATIONS

This application is based upon and claims the benefits of priority from the prior Japanese Patent Applications No. 2011-255737, filed in the Japanese Patent Office on Nov. 24, 2011, the entire content of which is incorporated herein by reference.

FIELD

Embodiments described herein relate generally to a liquid crystal display device.

BACKGROUND

A liquid crystal display device is widely used as a display device for a mobile terminal such as a mobile phone, a smartphone or a tablet device, a TV, a personal computer, and a car navigation system. The liquid crystal display device operates in various modes such as TN, IPS, VA, and OCB, and polarizing plates are fixed respectively to both surfaces of a liquid crystal display element of each mode such that absorption axes thereof cross at right angles. The polarizing plate, which has a polarizer formed of a stretched film obtained by stretching, e.g., a PVA film impregnated with iodine in one direction, is constructed by sandwiching both surfaces of the stretched film with a transparent film such as a TAC serving as a supporting film and adhering, with an adhesive, the transparent film to the both surfaces. A stretching direction of the PVA film corresponds to the absorption axis of the polarizer.

The stretched film is stretched in one direction in a ratio of several times an original length thereof when the iodine is impregnated, and thus, shrinkage in the stretching direction may occur even if the both surfaces of the polarizer film to be obtained are reinforced by the supporting film. The contraction may occur particularly under a severe environment such as high temperatures, which may cause peeling between the polarizing plate and a liquid crystal cell. This tendency becomes more promoted as a length of the absorption axis of the polarizer is increased, thus resulting in occurrence of peeling at corners of a display surface to degrade display quality. In view of this, development of a liquid crystal display device more excellent in durability against heat is demanded.

DETAILED DESCRIPTION

Figure 1:
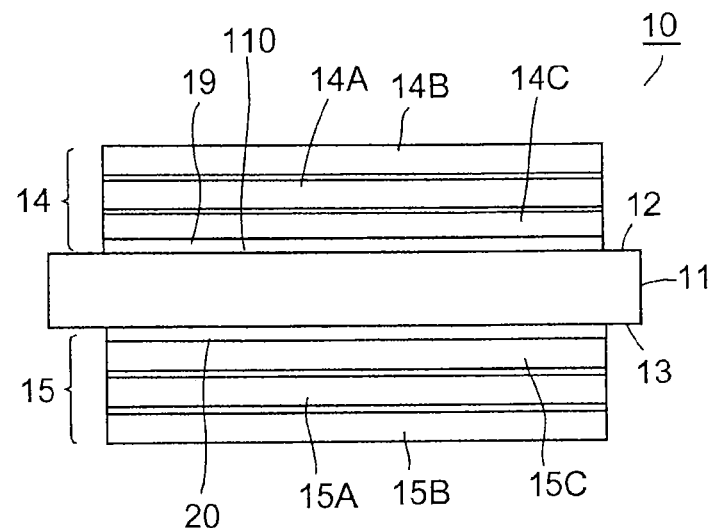
FIG. 1 is a schematic cross-sectional view of a liquid crystal display device according to an embodiment.

Embodiments will be described hereinafter with reference to the accompanying drawings. Throughout the drawings, the same or similar components are denoted respectively by the same reference symbols and will not be described repeatedly.

First Embodiment

A liquid crystal display device of the present embodiment includes a liquid crystal cell including a quadrilateral display surface and a liquid crystal layer enclosed between glass substrates and controlling light entering from a second surface side and transmitted therethrough to exit the light to a first surface side;

a first polarizing plate including a polarizer having an absorption axis and adhered to the first surface side of the liquid crystal cell with an adhesive layer; and a second polarizing plate including a polarizer having an absorption axis and adhered to the second surface side of the liquid crystal cell with an adhesive layer, wherein one of the polarizing plates including the polarizer with a larger maximum dimension in an absorption axis direction on the display surface is adhered to the glass substrate of the liquid cell with the adhesive layer having higher adhesion strength to the glass substrate than the adhesive layer of the other of the polarizing plates including the polarizer with a smaller maximum dimension in the absorption axis direction.

Further, in the other embodiment, a liquid crystal display device comprises:

a liquid crystal cell including a quadrilateral display surface and a liquid crystal layer enclosed between glass substrates and controlling light entering from a second surface side and transmitted therethrough to exit the light to a first surface side;

a first polarizing plate including a polarizer having an absorption axis and adhered to the first surface side of the liquid crystal cell with an adhesive layer; and a second polarizing plate including a polarizer having an absorption axis with a different maximum dimension in the absorption axis direction from the first polarizing plate and adhered to the second surface side of the liquid crystal cell with an adhesive layer, wherein one of the polarizing plates including the polarizer with a smaller maximum dimension in an absorption axis direction on the display surface is adhered to the glass substrate of the liquid cell with the adhesive layer having conductivity.

Also in the other embodiment, a liquid crystal display device comprises:

a liquid crystal cell including a rectangular display surface and a liquid crystal layer enveloped between a pair of glass substrates and controlling light entering from a second surface side and transmitted therethrough to exit the light to a first surface side;

a first polarizing plate having an absorption axis of a polarizer disposed at an inclination angle of from 0° to 45° in the counterclockwise direction with respect to a short side of the liquid crystal cell;

a conductive first adhesive layer adhering, at the first surface side, the glass substrate and the first polarizing plate;

a second polarizing plate having an absorption axis of a polarizer disposed in a crossed Nichol state with respect to the absorption axis of the first polarizing plate; and a second adhesive layer having higher electric resistance than the first adhesive layer and adhering, at the second surface side, the glass substrate and the second polarizing plate.

As illustrated in FIG. 1, a liquid crystal display device 10 includes a liquid crystal cell 11. The liquid crystal cell 11 operates in, e.g., a VA (Vertical Alignment) mode and has a function of controlling transmission of light entering from a rear side (second surface) 13 so as to exit the light from a front side (first surface) 12. The liquid crystal cell has a rectangular display surface 110 having a large number of pixels and has polarizing plates 14 and 15 adhered to the front and rear sides 12 and 13 thereof.

The front-side polarizing plate 14 includes a polarizing film 14A serving as a polarizer and supporting films 14B and 14C laminated respectively on both sides of the polarizing film 14A. The rear-side polarizing plate 15 includes a polarizing film 15A serving as a polarizer and supporting films 15B and 15C laminated respectively on both sides of the polarizing film 15A. The supporting films 14C and 15C of the polarizing plates 14 and 15 serve as phase difference films 14C and 15C, which are disposed so as to face the liquid crystal cell 11 side. It follows that the front-side phase difference film 14C and rear-side phase difference film 15C face each other across the liquid crystal cell 11. The phase difference film may be provided separately from the supporting film for supporting the polarizing film.

Fixing between the polarizing plates 14, 15 and liquid crystal cell 11 is achieved using an adhesive. The adhesive is, e.g., a gel-like solid having a high viscosity and a low elastic modulus and does not change in state after adhering. In the present embodiment, adhesion strength to the liquid crystal substrate at high temperatures is made different between a front-side adhesive 19 and a rear-side adhesive 20. Fixing of substrates in the polarizing plates 14, 15 and liquid crystal cell 11 is achieved using an adhesive having flexibility so as to reduce internal stress between films to thereby reduce stress/strain.

However, in the polarizing plate in which a stretched film significantly contracted in a stretching direction under high temperatures and thus the absorption axis thereof is directed to corners of the display surfaces, stress is concentrated on the corners to raise a possibility of occurrence of warpage or peeling. In the present embodiment, adhesion strength of the adhesive of one polarizing plate on a side at which the absorption axis of the polarizing film is directed to the corners of the display surface or portions near the corners thereof is made higher than adhesion strength of the adhesive of the other polarizing plate on a side at which the absorption axis is disposed in a crossed Nichol state with respect to the absorption axis of the one polarizing plate so as to be directed to portions relatively away from the corners of the display surface. An increase in the adhesion strength increases elastic force of the adhesive to result in a reduction of stress reduction effect, whereas stress generated in the polarization plate is dispersed, making it possible to reduce concentration of stress on the corner regions of the display surface.

Figure 3:
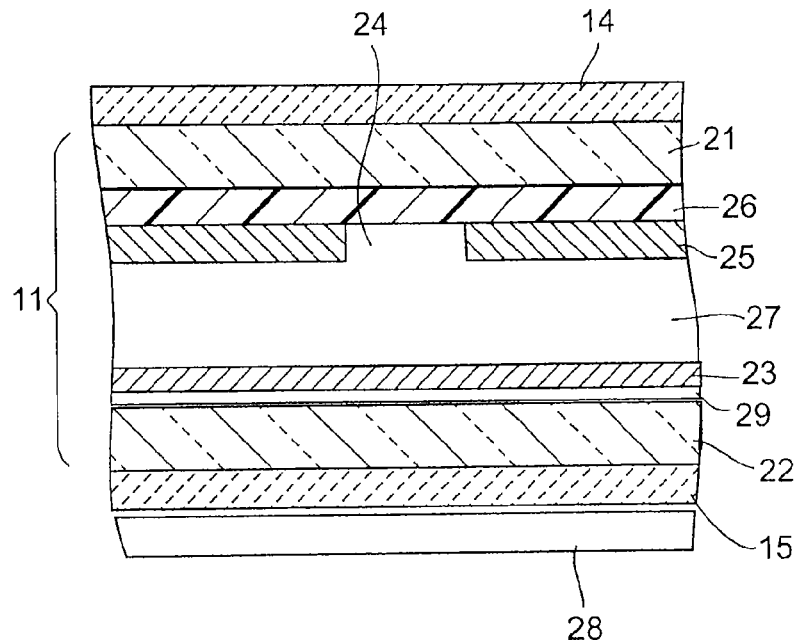
FIG. 3 is a schematic cross-sectional view for explaining a liquid crystal cell of a liquid crystal display device according to an embodiment.

As illustrated in FIG. 3, the liquid crystal cell 11 operates in the VA mode and has two glass substrates 21 and 22. Between the glass substrates 21 and 22, a transparent pixel electrode 23 arranged in a matrix pattern for each pixel is disposed near the rear-side glass substrate 22. Further, a transparent opposite electrode 25 with a rectangular non-conductive slit 24 is disposed near the front-side glass substrate 21 corresponding to the pixel electrode 23. The slit is arranged corresponding to each pixel for multi-domain formation. Furthermore, a color filter layer 26 is formed between the opposite electrode 25 and front-side glass substrate 21.

Surfaces of the electrodes 23 and 25 are subjected to alignment treatment, and a liquid crystal layer 27 having a negative dielectric anisotropy is filled therebetween. When no voltage is applied to the electrodes 23 and 25, liquid crystal molecules in the liquid crystal layer are vertically aligned, and when voltage is applied thereto, the liquid crystal molecules are inclined toward a horizontal direction in opposite directions with the slit 24 of the opposite electrode as a boundary.

A backlight 28 is disposed on the rear-side of the liquid crystal cell. Light from the backlight 28 is transmitted through the polarization film 15A of the rear-side polarizing plate 15 to be linearly-polarized light and then made into a circularly-polarized light by the ¼ wavelength phase difference film 15G. The circularly-polarized light is modulated by the inclination angle of the liquid crystal molecules in the liquid crystal cell 11, and an amount of light to be transmitted through the front-side polarizing plate 14 is controlled in correspondence with the modulation control.

Figure 2:
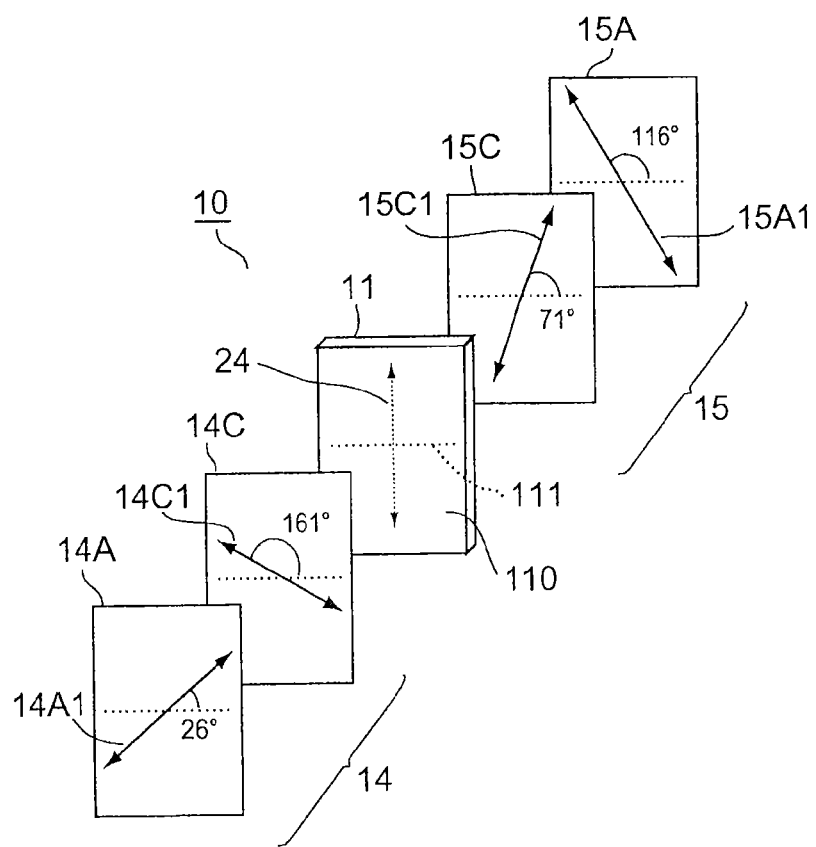
FIG. 2 is an exploded view for explaining an arrangement of an absorption axis of a polarizing plate and a retardation axis of a phase difference plate according to an embodiment.

FIG. 2 illustrates the absorption axes and retardation axes of the polarization plates in a case where the liquid crystal cell 11 of, e.g., a mobile terminal has the image display surface having a rectangular shape elongated in a vertical direction (aspect ratio of 16:9). In FIG. 2, the front-side polarization plate 14 is illustrated on the left side, and rear-side polarization plate 15 is on the right side. In the liquid crystal cell 11, the slit 24 of the opposite electrode is extended in a vertical direction of the display surface.

The phase difference film is a biaxial phase difference film in which a vertical refractive index $N_z$ is 1.6, the alignment direction of the liquid crystal in the liquid crystal cell is vertical, $\Delta n$ is 0.1, and a cell gap of the display section is 4 μm.

An absorption axis 14A1 of the polarization film 14A constituting the polarizer of the front-side polarizing plate 14 is disposed at an inclination angle of 26° in the counterclockwise direction with respect to a horizontal reference line 111 of the liquid crystal cell 11. Note that, in a case where the liquid crystal cell having such a rectangular shape is used, the absorption axis 14A1 of the front-side polarization film 14A should be disposed at an inclination angle of from 0° to 45° in the counterclockwise direction with respect to a short side of the rectangular liquid crystal cell. The retardation axis of the phase difference film 14C to be adhered to the above polarization film is disposed at an inclination angle of 161° (absorption axis+90°±45°). On the other hand, an absorption axis 15A1 of the polarization film 15A of the rear-side polarizing plate 15 is disposed in a crossed Nichol state (perpendicular) with respect to the absorption axis 14A1 of the front-side polarization film 14A, that is, disposed at an inclination angle of 116°, and the retardation axis of the phase difference film 15C is disposed at an inclination angle of 71°. The inclination angle of the absorption axis of the polarization plate is determined depending on a structure of a display cell. The absorption axis of one polarization plate is disposed at an inclination angle of from 20° to 30° with respect to the horizontal direction of the display surface, and the absorption axes of the polarization plates on both sides are not axisymmetrical with respect to the vertical direction of the display surface. It follows that both the absorption axes 14A1 and 15A1 are not parallel or perpendicular to the sides of each of the phase difference films or the sides of the display surface.

The polarizer is obtained by stretching, generally, a PVA film in an iodine aqueous solution so as to allow the iodine to be absorbed to the PVA film, allowing its absorption axis to be formed in the stretching direction. Similarly, the retardation axis of the phase difference film is formed by stretching a resin film such as a TAC film or a polycarbonate film.

As one embodiment, in FIG. 1 to FIGS. 4(a) and 4(b), the polarization plate uses a TAC film as the supporting film, a stretched PVA film as the polarizer, and a stretched TAC film as the phase difference film. Affixed surfaces of the films are subjected to saponification treatment, and films are adhered with an adhesive made of an aqueous solution of saponified PVA.

Figure 4A:
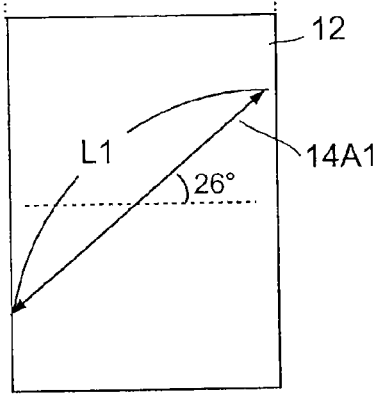
FIGS. 4(a) and 4(b) are schematic plan views for explaining a polarizing plate according to an embodiment.
Figure 4B:
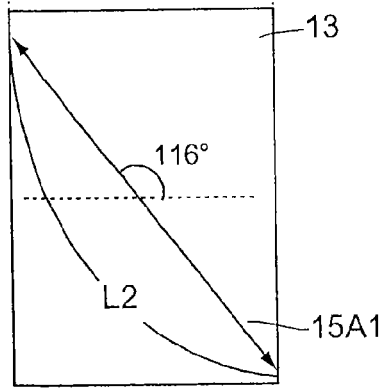

FIGS. 4(a) and 4(b) each illustrate a relationship between a surface of the polarization plate and absorption axis. FIG.

4(a) illustrates the front-side polarization plate, and FIG. 4(b) illustrates the rear-side polarization plate. Assuming that the inclination angle of the absorption axis of the front-side polarization plate is 26°, the longest dimension from one side of the front-side polarization plate to the other thereof is L1, inclination angle of the absorption axis of the rear-side polarization plate is 116°, and the longest dimension from one side of the rear-side polarization plate to the other thereof is L2, L2>L1 is satisfied. The absorption axis and retardation axis of the rear-side polarization plate 15 are each disposed approximately diagonally so as to extend from the center of the display surface to the corners thereof. As described above, the rear-side polarization plate of the present embodiment has a larger maximum dimension in the absorption axis. In other words, a direction in which the larger maximum dimension of the stretching direction of the stretched film is large is approximately diagonal.

Thus, at high temperatures exceeding room temperature (e.g., 60° C. to 100° C.), contraction or shrinkage of the polarization plate is much more likely to occur in the rear-side polarization plate having the longest dimension L2.

The adhesive for bonding the polarization plate to the substrate of the liquid crystal cell has a function of absorbing/reducing the internal stress of the films constituting the polarization plate. In the configurations illustrated in FIG. 1 to FIGS. 4(a) and 4(b), adhesion strength of the adhesive for adhering the polarization plate to the glass substrate at high temperatures is made different between the front-side and rear-side of the liquid cell.

In the present embodiment, an adhesive through which an adhesion strength P2 at high temperatures between the polarization plate having a polarization film having a larger maximum dimension in the absorption axis direction on the display surface and the glass substrate is higher than an adhesion strength P1 between the polarization plate having a polarization film having a smaller maximum dimension in the absorption axis direction and the glass substrate is employed. This adhesive is high in elastic modulus at high temperatures, and the internal stress of the polarization plate is received and dispersed by the adhesive and glass substrate. Thus, the internal stress of the polarization plate concentrated near the corners of the display surface is reduced to suppress occurrence of peeling.

For example, as the adhesive layer for adhering the rear-side polarization plate, an adhesive obtained by mixing crosslinking agent and silicon coupling agent with acrylic based resin is used. As the adhesive for adhering the front-side polarization plate, an adhesive obtained by mixing metal-oxide powder such as Ti or Zn imparting conductivity in the rear-side adhesive is used. The mixing of the metal-oxide powder slightly reduces the adhesion strength.

The polarization plate having a resin film layered structure is easily electrostatically charged to give influence on the liquid crystal alignment, so that it is preferable to form an antistatic film on a side (e.g., front-side) of the liquid crystal surface at which electrostatic charge easily occurs. In one embodiment, conductivity of about $10^8 \Omega/\square$ to $10^{10} \Omega/\square$ is imparted to the adhesive.

In particular, the front side of the liquid crystal display device is easily electrostatically charged, so that it is necessary to prevent the front side from being electrostatically charged by using the adhesive to which conductivity has been imparted. On the other hand, the adhesive to which conductivity has been imparted is reduced in adhesion strength. Thus, if the polarization plate is significantly contracted in the absorption axis direction, the adhesive is likely to be unable to suppress warpage or peeling sufficiently at the corner portions. In order to avoid this, of the two polarization plates disposed in a crossed Nichol state, one that has the smaller maximum dimension L1 in the absorption axis is disposed on the front side. Since the maximum dimension of the polarizing plate in the absorption axis direction is small, this polarizing plate is less contracted in the absorption axis direction, so that even if the adhesion strength of the adhesive is reduced, occurrence of warpage or peeling at the corner portions can be suppressed. On the other hand, the polarizing plate disposed on the rear side has the longest dimension L2 in the absorption axis, so that this polarizing plate is significantly contacted in the absorption axis direction. However, the non-conductive adhesive to be used on the rear side is high in adhesion strength, so that even if the polarizing plate is significantly contacted in the absorption axis direction, occurrence of warpage or peeling at the corner portions can be suppressed.

The rear-side adhesive may be made conductive as needed. The higher the conductivity of the adhesive, in other words, the lower the electric resistance, the lower the adhesion strength of the adhesive becomes. Therefore, when an adhesive having lower electric resistance is used for the front side as a first adhesive layer, and an adhesive having higher electric resistance than that of the first adhesive layer is used for the rear side as a second adhesive layer, the same effect as above can be obtained.

Second Embodiment

In the second embodiment, a layer thickness of the adhesive layer 20 of the rear-side polarizing plate 15 is made thicker than a layer thickness of the adhesive layer 19 of the front-side polarizing plate 14. Peeling stress is dispersed in the adhesive layer, so that the thicker the layer thickness, the higher the adhesion strength. Thus, the adhesion strength of the adhesive of the rear-side polarizing plate having a larger maximum dimension in the absorption axis direction can be made much higher than adhesion strength of the adhesive of the front-side polarizing plate.

For example, a transparent acrylic solvent-based resin is used as the adhesive. In this case, when the layer thickness of the adhesive is doubled, the adhesion strength thereof approximately doubles. For example, adhesion strength to glass is 8.8 (N/25 mm) when the adhesive layer is 25 µm thickness, and 16.7 (N/25 mm) when 50 µm thickness. The adhesion strength is measured by conducting a T-type peeling test or 180° peeling test. For example, in the 180° peeling test, the adhesion strength is represented by force (Newton) applied when a 25 mm width tape adhered to a glass substrate through the adhesive layer is peeled in a 180° direction.

The adhesive layer 19 of the front-side polarizing plate 14 may be given conductivity.

Although the VA-mode liquid crystal cell has been described as the embodiments, the present invention may be applied to other types of liquid crystal cell, such as a TN mode and an IPS mode.

While certain embodiments of the inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a liquid crystal cell including a liquid crystal layer enclosed between glass substrates, the liquid crystal cell having a first surface and a second surface opposite to the first surface, the first surface being quadrilateral, the liquid crystal cell controlling light entering from the second surface to make the light to transmit through the liquid crystal cell and to exit from the first surface;
a first polarizing plate including
 a first polarizer having a first absorption axis,
 a first phase difference film provided between the first polarizer and the first surface, the first phase difference film including a first side inclined with the first absorption axis, and
 a first adhesive layer provided between the first phase difference film and the first surface, the first adhesive layer adhering to the first surface, the first adhesive layer having a first adhesive strength with respect to the first surface,
 the first polarizer having a first dimension in a first direction along the first absorption axis;
a second polarizing plate including
 a second polarizer having a second absorption axis, the second absorption axis being perpendicular to the first absorption axis,
 a second phase difference film provided between the second polarizer and the second surface, the second phase difference film having a second side inclined with the second absorption axis, and
 a second adhesive layer provided between the second phase difference film and the second surface, the second adhesive layer adhering to the second surface, the second adhesive layer having a second adhesive strength with respect to the second surface, the second adhesive strength being larger than the first adhesive strength,
 the second polarizer having a second dimension in a second direction along the second absorption axis, the second dimension being larger than the first dimension; and
a backlight, the second polarizing plate being disposed between the backlight and the liquid crystal cell,
the first adhesive layer being conductive,
wherein
 the second adhesive layer is formed of an adhesive the same as an adhesive forming the first adhesive layer, and
 a conductivity of the first adhesive layer is not less than $10^8 \Omega/\square$ and not more than $10^{10} \Omega/\square$.

2. The liquid crystal display device according to claim 1, wherein
the second adhesive strength is larger than the first adhesive strength in a temperature range where the second polarizer shrinks.

3. The liquid crystal display device according to claim 1, wherein
the liquid crystal cell has a pair of electrodes formed to sandwich the liquid crystal layer,
the liquid crystal cell includes
 an opposite electrode provided on a side of the first surface, and
 a pixel electrode provided on a side of the second surface, and
a slit is formed on the opposite electrode,
wherein the liquid crystal cell comprises a VA mode structure.

4. The liquid crystal display device according to claim 1, wherein
a thickness of the second adhesive layer is thicker than a thickness of the first adhesive layer.

* * * * *